United States Patent [19]

Meiss et al.

[11] Patent Number: 4,764,200

[45] Date of Patent: Aug. 16, 1988

[54] APPLICATION OF FINELY DIVIDED DICYANODIAMIDE ONTO AMMONIUM-CONTAINING AND SULFATE-CONTAINING FERTILIZERS

[75] Inventors: Otto Meiss, Ludwigshafen; Robert E. Nitzschmann, Frankenthal, both of Fed. Rep. of Germany

[73] Assignee: BASF Aktiengesellschaft, Fed. Rep. of Germany

[21] Appl. No.: 5,937

[22] Filed: Jan. 22, 1987

[30] Foreign Application Priority Data

Jan. 22, 1986 [DE] Fed. Rep. of Germany ....... 3601805

[51] Int. Cl.⁴ ............................ C05C 1/02; C05C 9/00
[52] U.S. Cl. .......................................... 71/28; 71/59; 71/60; 71/64.03; 71/64.07
[58] Field of Search ...................... 71/27–30, 71/58–60, 64.03, 64.06, 64.07, 64.13

[56] References Cited

U.S. PATENT DOCUMENTS 4,582,524  12/1986  Michaud et al. .................. 71/28
4,626,270  4/1986  Lobitz ............................ 71/27

FOREIGN PATENT DOCUMENTS 0051790  4/1980  Japan ............................. 71/28

Primary Examiner—Ferris H. Lander
Attorney, Agent, or Firm—Keil & Weinkauf

[57] ABSTRACT

Dicyanodiamide is applied onto the surfaces of ammonium-containing and sulfate-containing fertilizers at a fertilizer temperature of from 60° to 130° C. by mixing with finely divided dicyanodiamide. An aqueous solution containing calcium nitrate is applied at the same time or directly thereafter, with further mixing.

5 Claims, No Drawings

APPLICATION OF FINELY DIVIDED DICYANODIAMIDE ONTO AMMONIUM-CONTAINING AND SULFATE-CONTAINING FERTILIZERS

The present invention relates to a process for the preparation of dicyanodiamide-containing nitrogen fertilizers having a long-term action.

It is known that ammonium-containing nitrogen fertilizers are converted in the soil to nitrite and nitrate by bacteria. This nitrification takes place relatively rapidly, particularly in well ventilated, neutral to alkaline soils. Because of its high mobility in the soil, there is the constant danger of nitrated nitrogen being lost as a result of being washed out, particularly in areas of high precipitation. It is known that this nitrification can be slowed down by adding nitrification inhibitors to the stated nitrogen fertilizers, and a very wide variety of compounds are known to be suitable for this purpose. Even in low concentrations, these compounds can slow down the action of the nitrifying bacteria present in the soil, so that the ammonium ion, which adheres relatively well to the soil, is only slowly converted to the nitrate ion, which can be readily assimilated by the plants but is also readily washed out. Consequently, such nitrogen fertilizers containing nitrification inhibitors are distinguished by a delayed release of nitrogen.

French Pat. No. 1,232,366 discloses the nitrification-inhibiting effect of dicyanodiamide. The latter can be added to the fertilizer during the actual preparation of the fertilizer or during granulation. In the former case, a fertilizer particle is obtained in which the dicyanodiamide is homogeneously distributed, whereas in the latter case the dicyanodiamide is present only on the surface of the particle.

When the dicyanodiamide is introduced into the fertilizer prior to granulation, it is impossible to prevent decomposition of the dicyanodiamide at the usual temperatures of from 100° to 140° C. in the melt and during granulation in conjunction with the relatively long mean residence time of not less than about 30 minutes at these temperatures. The loss of dicyanodiamide in this procedure is 30% or more.

Applying the dicyanodiamide onto the ready-granulated fertilizers has the disadvantage that the dicyanodiamide does not adhere firmly to the surface and results in troublesome abrasion and dusts when the fertilizer is handled. DE-C No. 25 31 962 discloses that this disadvantage can be overcome if dicyanodiamide having a particle size of less than 0.3 mm is applied to the surface of the ammonium-containing or amide-containing compounds using an adhesion promoter. The adhesion promoters used are vegetable, animal or mineral oils, eg. soybean oil, neatsfoot oil or heavy oil. This process has the disadvantage that organic and/or inorganic materials foreign to fertilizers are introduced into the fertilizer, together with the adhesion promoters. Moreover, the oils are absorbed into the fertilizer particle, with the result that their adhesion-promoting effect is reduced or even completely eliminated.

It is an object of the present invention to provide a process for applying finely divided dicyanodiamide onto the surfaces of ammonium-containing and sulfate-containing solid fertilizers, in which decomposition of the dicyanodiamide is substantially prevented and at the same time an adhesive bond between the dicyanodiamide and the fertilizer is ensured.

We have found that this object is achieved if the fertilizer, which is at 60°–130° C., is mixed with the powdered dicyanodiamide, and at the same time or directly thereafter an aqueous solution containing calcium nitrate is added with further mixing. The fertilizer is preferably at from 80° to 120° C.

The process according to the invention is useful both for the treatment of crystalline or powdered fertilizers and for granulated fertilizers. The amount of dicyanodiamide to be applied is advantageously from 1 to 6, preferably from 2 to 4, % by weight, based on the fertilizer.

The amount of calcium nitrate required depends on the amount of dicyanodiamide being applied, the particle size of the fertilizer and the nature of its surface, and is from 0.2 to 6% by weight, based on the fertilizer. In the case of finely divided fertilizers, ie. fertilizers having a fairly large surface area, or where relatively large amounts of dicyanodiamide are applied, the amount of calcium nitrate solution required is generally in the upper range.

The dicyanodiamide advantageously has the particle size of less than 0.2 mm. The dicyanodiamide is applied according to the invention by mixing the two components, ie. fertilizer and the dicyanodiamide, with the calcium nitrate solution in an apparatus which is suitable for this purpose, eg. a rotary drum, a pan granulator or the like. Since the fertilizers, regardless of whether they are crystalline or granulated, are in any case obtained from a production process at a temperature within the stated range, they need not be heated up prior to the treatment according to the invention. The calcium nitrate can be added either at the same time as the dicyanodiamide is mixed with the fertilizer or afterward. The calcium nitrate is applied in the form of an aqueous solution, which in general has a concentration of from 40 to 50% by weight. The concentration of $Ca(NO_3)_2$ may also be lower, particularly when the heat content of the hot fertilizer is sufficient to vaporize the water content. The calcium nitrate solutions may furthermore contain ammonium nitrate in a weight ratio of $Ca(NO_3)_2$ to $NH_4NO_3$ of from 1:1 to 3:1.

As a result of the simultaneous or subsequent addition of the aqueous calcium nitrate solution, the surface of the fertilizer is rapidly cooled and decomposition of the dicyanodiamide is virtually completely prevented.

After the addition of the calcium nitrate solution, the fertilizer is cooled in the usual manner and/or treated with a conventional anticaking agent. The ammonium-containing and sulfate-containing fertilizers treated according to the invention possess particularly smooth surfaces which exhibit little abrasion and are free of organic and/or inorganic adhesion promoters which are foreign to fertilizers. By applying the dicyanodiamide, in accordance with the invention, onto the fertilizer after the shaping procedure, long residence times of the dicyanodiamide at high temperatures are avoided. Moreover, it is also possible to reduce the temperature of the fertilizer by preliminary cooling before applying the dicyanodiamide. Hence, it is possible to adapt the temperature and the residence time to the particular requirements and thus avoid losses of dicyanodiamide. The additional water introduced is partly evaporated and partly bound as water of hydration in the gypsum formed, and leads to virtually no increase in the water content of the ready-prepared product.

EXAMPLE 1

250 kg of ammonium nitrate sulfate granules having a particle diameter of from 1.5 to 5 mm and at from 90° to 95° C. are mixed with 10 kg of dicyanodiamide on a rotating pan. After a mixing time of 4 minutes, 0.75 kg of a 45% strength by weight calcium nitrate solution at 20° C. is sprayed on with further mixing (2 minutes). The product is then cooled and stored. It has a smooth surface and does not produce dust when handled.

EXAMPLE 2

0.75 kg of a solution which contains 40% by weight of $Ca(NO_3)_2$ and 25% by weight of $NH_4NO_3$ is sprayed onto ammonium nitrate sulfate granules, as described in Example 1. In this case too, the dicyanodiamide is completely bound, and the product obtained produces little dust and has a smooth surface.

EXAMPLE 3

In a horizontal rotary drum which is 12 m long, has a diameter of 3 m and a mean product residence time of about 15 minutes and is charged continuously with 40 tonnes/h of ammonium nitrate sulfate granules (particle size 1.5–5 mm, temperature 105° C.), 1.6 tonnes/h of dicyanodiamide are mixed continuously with the said granules. After a short mixing zone (about 10% of the drum length), 120 kg/h of a calcium nitrate solution containing 45% by weight of $Ca(NO_3)_2$ are applied. The product discharged from the drum has a smooth, abrasion-resistant surface.

EXAMPLE 4

60 tonnes/h of a sulfate-containing and ammonium-containing NPK fertilizer (particle size 1.5–5 mm, temperature 100° C.) are passed through the rotary drum described in Example 3, and 2.4 tonnes/h of dicyanodiamide are added. After a short mixing zone (about 10% of the drum length), 180 kg/h of a 45% strength by weight calcium nitrate solution are sprayed on. At the end of the drum, a dust-free product having a smooth surface is obtained.

EXAMPLE 5

250 kg of crystalline ammonium sulfate having a particle size of from 0.5 to 1.5 mm and at 100° C. are mixed with 10 kg of dicyanodiamide on a rotating pan of 3 m diameter. After a mixing time of 4 minutes, 15 kg of a 45% strength by weight calcium nitrate solution are added. Mixing is continued for a further 2 minutes, after which the preparation is complete. The product does not produce any dust when handled.

EXAMPLE 6

250 kg of granulated ammonium sulfate having a particle size of from 1 to 5 mm and at 100° C. are mixed with 10 kg of dicyanodiamide on a rotating pan as described in Example 5. After a mixing time of 4 minutes, 4 kg of 45% strength by weight calcium nitrate solution are added. Mixing is continued for a further 2 minutes, after which a glossy, abrasion-resistant product can be removed from the pan.

We claim:

1. A process for applying finely divided dicyanodiamide onto the surface of an ammonium-containing and sulfate-containing fertilizer which comprises: mixing the powdered dicyanodiamide with the fertilizer which is at a temperature of from 60° to 130° C., and at the same time or directly thereafter adding an aqueous solution containing calcium nitrate to the fertilizer with further mixing.

2. The process of claim 1, wherein from 1 to 6% by weight, based on the fertilizer, of dicyanodiamide are applied to the fertilizer.

3. The process of claim 1, wherein from 0.2 to 6% by weight of calcium nitrate in the form of an aqueous solution are applied to the fertilizer.

4. The process of claim 1, wherein the aqueous solution containing calcium nitrate has a concentration of from 40 to 50% by weight.

5. The process of claim 1, wherein the fertilizer is at from 80° to 120° C.

* * * * *